United States Patent
Hall et al.

(10) Patent No.: US 11,855,852 B1
(45) Date of Patent: Dec. 26, 2023

(54) NETWORK ARCHITECTURE VISUALIZER AND DESIGN TOOL

(71) Applicant: Truist Bank, Charlotte, NC (US)

(72) Inventors: Kenneth Hall, Roswell, GA (US); Michael Radonis, Holly Springs, NC (US); Bobby Len Robins, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 49 days.

(21) Appl. No.: 17/839,996

(22) Filed: Jun. 14, 2022

(51) Int. Cl.
  *H04L 41/14* (2022.01)
  *G06F 3/04817* (2022.01)
  *G06F 3/0486* (2013.01)

(52) U.S. Cl.
  CPC .......... *H04L 41/145* (2013.01); *G06F 3/0486* (2013.01); *G06F 3/04817* (2013.01)

(58) Field of Classification Search
  None
  See application file for complete search history.

(56) References Cited

U.S. PATENT DOCUMENTS

| | | | |
|---|---|---|---|
| 11,323,330 B1* | 5/2022 | Chang | H04L 41/14 |
| 2019/0044826 A1* | 2/2019 | Flores Guerra | H04W 4/08 |
| 2021/0226847 A1* | 7/2021 | Jindal | H04L 61/5007 |

* cited by examiner

*Primary Examiner* — Angela Nguyen
(74) *Attorney, Agent, or Firm* — Kilpatrick Townsend & Stockton LLP; Michael A. Springs, Esq.

(57) ABSTRACT

A network architecture visualizer and design tool is disclosed. In one example, a computer system may generate a graphical user interface of a network design application. The graphical user interface can include a drag and drop canvas. The computer system can receive user input at the graphical user interface for spatially positioning one or more template objects that correspond to network infrastructure components. The arrangement of the template objects can form a computer network infrastructure. The computer system can determine one or more parameters of the template objects that correspond to the infrastructure components and then automatically generate a build sheet that includes instructions usable to implement the network architecture.

20 Claims, 7 Drawing Sheets

NETWORK ARCHITECTURE VISUALIZER AND DESIGN TOOL

TECHNICAL FIELD

The present disclosure relates generally to graphical user interfaces. More specifically, but not by way of limitation, this disclosure relates to a network architecture visualizer and design tool.

BACKGROUND

Designing a computer network typically involves assessments of the capabilities of the resources forming the network, the demands of the applications and services supported by the network, and other engineering constraints. For example, deploying a new application into a computing environment may entail provisioning new or modified networking infrastructure (e.g., compute servers, storage devices, networking hardware, etc.) to support the new application. Network architects may draft a computer network architecture design that can be used as a blueprint for constructing the computer network.

SUMMARY

One example of the present disclosure includes a method involving generating a graphical user interface (GUI) of a network design application having a drag and drop canvas, the network design application including template objects representing computer infrastructure components. Each template object can comprise a configuration for a corresponding computer infrastructure component and being individually positionable on the drag and drop canvas. The method can involve receiving, at the GUI, user input for spatially positioning the template objects on the drag and drop canvas in a particular arrangement to form a computer network architecture. The method can involve determining parameter values for the template objects forming the computer network architecture. The method can involve generating a build sheet for the computer network architecture based on the parameter values for the template objects and the particular arrangement of the template objects on the drag and drop canvas. The build sheet can comprise a component inventory for the computer network architecture and instructions usable to provision the computer network architecture. Some or all of the method can be implemented by a processor.

Another example of the present disclosure includes a computer system comprising a processor and a memory. The memory can store computer-executable instructions that are executable by the processor for causing the computer system to perform operations. The operations can include generating a graphical user interface (GUI) of a network design application having a drag and drop canvas, the network design application including template objects representing computer infrastructure components. Each template object can comprise a configuration for a corresponding computer infrastructure component and being individually positionable on the drag and drop canvas. The operations can include receiving, at the GUI, user input for spatially positioning the template objects on the drag and drop canvas in a particular arrangement to form a computer network architecture. The operations can include determining parameter values for the template objects forming the computer network architecture. The operations can include generating a build sheet for the computer network architecture based on the parameter values for the template objects and the particular arrangement of the template objects on the drag and drop canvas. The build sheet can comprise a component inventory for the computer network architecture and instructions usable to provision the computer network architecture.

Another example of the present disclosure includes a non-transitory computer-readable storage medium storing instructions that are executable by a processor for causing a computer system to perform operations. The operations can include generating a graphical user interface (GUI) of a network design application having a drag and drop canvas, the network design application including template objects representing computer infrastructure components. Each template object can comprise a configuration for a corresponding computer infrastructure component and being individually positionable on the drag and drop canvas. The operations can include receiving, at the GUI, user input for spatially positioning the template objects on the drag and drop canvas in a particular arrangement to form a computer network architecture. The operations can include determining parameter values for the template objects forming the computer network architecture. The operations can include generating a build sheet for the computer network architecture based on the parameter values for the template objects and the particular arrangement of the template objects on the drag and drop canvas. The build sheet can comprise a component inventory for the computer network architecture and instructions usable to provision the computer network architecture.

DETAILED DESCRIPTION

Figure 1:
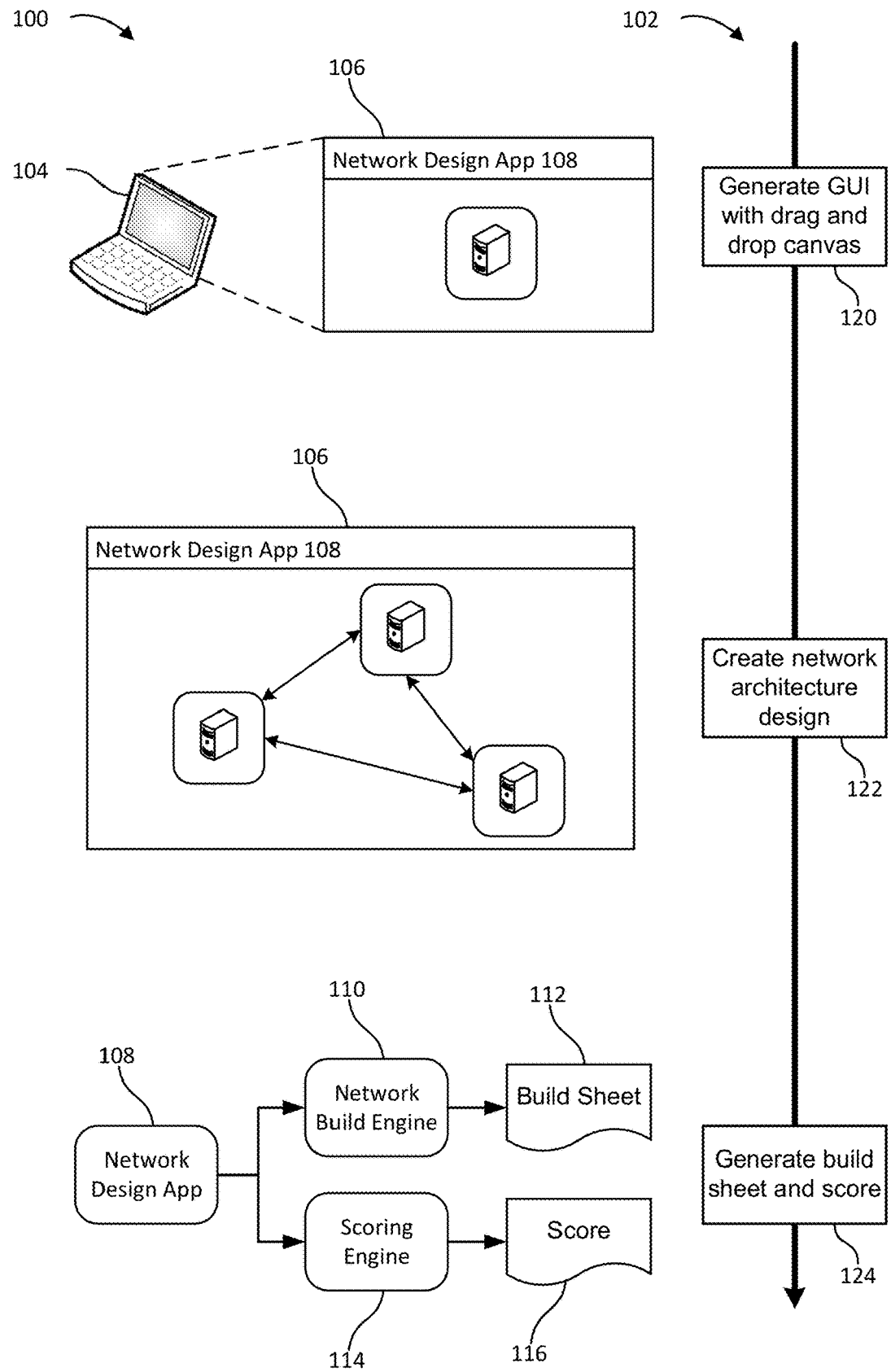
FIG. 1 is a simplified block diagram and associated flow chart of an example process to design a network architecture and generate a network architecture build sheet, according to some embodiments.

Certain aspects and features of the present disclosure relate to an interactive graphical user interface for designing a network architecture. A corresponding system is also provided for automatically translating the network architecture design from a graphical representation to a build sheet. The build sheet can include a technical specification and instructions that can be used to provision the corresponding network architecture. As an example, a network architect can use drafting software, computer-aided design (CAD)

software, or other similar network design application to design a computer network. Designing the network can include arranging network infrastructure components (e.g., servers, storage devices, networking devices, etc.) on a canvas of the network design application. The canvas may be presented as part of a GUI of the network design application. The canvas may be a drag and drop canvas, on which the network designer can position icons or other graphical objects that represent the network infrastructure components. The objects may be positioned by manipulating the objects with a mouse, stylus, touch pad, or other input device. The network designer can then specify parameters (e.g., number of processors and/or processor cores of compute nodes, amount of storage of storage devices, etc.) of the network infrastructure components and draw connections between the objects representing the proposed networking interconnections.

The arrangement of network infrastructure components on the drag and drop canvas may be used as a graphical plan for the proposed network. To implement the computer network from the graphical plan, a computer system can extract information about the parameters of the infrastructure components and use the information to automatically generate a "build sheet." The build sheet can include an organized collection of parameter data corresponding to the infrastructure components of a designed network architecture. The build sheet can also include instructions usable to provision the infrastructure components within the network. For example, an instruction could specify that a compute node within the network is to have four processor cores and 32 GB of dynamic memory. The instruction could further identify an existing computing device (e.g., a server device within a rack residing in a data center) on which the node is to be provisioned, with the computing device having the required processor and memory configuration. The instruction may be usable for manually provisioning the components, for example by a networking technician or networking engineer. In some embodiments, the instruction is usable for automatically provisioning the networking components, for example by an infrastructure provisioning server.

In some examples, the network design application can be a special-purpose drafting or visualization application specifically created for designing network architectures. The network design application can include one or more template objects that represent the network infrastructure components. The template objects may include graphical icons that can be positioned (e.g., "dragged and dropped") on the canvas. The template objects may also include the parameters (e.g., component type, processors, memory, operating system, etc.) of the represented component. For example, a user can interact with the template object to display the parameters as a drop-down menu within the GUI of the network design application. The user can then modify the parameters of the component according to the desired network design. The template objects may also display indicators or other graphical elements that show the current state of the parameters for easy identification by the user. In other examples, the network design application can be a general-purpose drafting or visualization application such as Microsoft Visio, an engineering drafting application like Autodesk AutoCAD, or other similar application. In some such examples, the network design application may be supplemented with one or more template objects that represent the network infrastructure components, as described above. The template objects may be a modification of, extension to, or plugin for the drafting application.

In addition to generating a build sheet, the computer system may also include a scoring engine to evaluate the proposed network design with respect to an engineering metric. For example, a proposed network design may be given a score based on the financial cost associated with procuring, provisioning, operating, and/or maintaining the infrastructure components. The score may be used to determine whether the proposed network meets a cost requirement (e.g., a budget). In another example, the score may be based on efficiency metric associated with the efficient use of existing computing resources. The proposed network design may include template objects for new computing components (e.g., additional server device) when existing components are available. The scoring engine can then provide an efficiency score that can be used to determine whether the proposed network meets an efficiency requirement or other engineering metric.

Numerous advantages can be provided by the techniques described herein. Standardized template objects for network infrastructure components can greatly improve the speed at which computer networks are designed or modified, reducing computational overhead of a user inputting individual parameters of the components into the application. Automatically generated build sheets can also reduce computational overhead resulting from multiple manual inputs to specify a network component inventory. Moreover, the build sheet may be used as an input into an automated network provisioning system that can automatically configure the designed network with minimal manual intervention. For example, a build sheet can be used to configure a portion of the computing resources within an existing data center to implement the network design without manually installing and connecting new computing devices in the data center. Reducing the need for manual steps in provisioning the network reduces the likelihood of configuration errors in the computer network, improving performance of the computing resources within the network. Additional advantages will be made clear to one skilled in the art upon reviewing the remainder of this disclosure.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a simplified block diagram 100 and associated flow chart of an example process 102 to design a network architecture and generate a network architecture build sheet 112, according to some embodiments. The diagram depicts a computer system 104 that can perform the operations of process 102. The computer system 104 may be a personal computer or user device configured to run a network design application. Examples of the computer system 104 can include a desktop computer, laptop, tablet, smartphone, etc. The computer system 104 may also include additional computing devices (e.g., a server device, a distributed computing system, etc.) for performing one or more operations of process 102. For example, the network design application may be provided as a web application from a server device, and a user device may communicate with the server device to access the web application. Additional details about computer systems that are capable of performing the techniques of this disclosure are provided below with respect to FIG. 6. The computer system 104 and the network design application 108 used according to the techniques described herein may be referred to as a "network architecture visualizer."

The process 102 begins at block 120 with the computer system 104 generating a GUI 106 for a network design application 108. The GUI 106 can include a drag and drop canvas. A user interacting with the GUI 106 can manipulate graphical elements of the network design application 108 by moving and placing the elements on the canvas. The user may interact with any suitable interface device of computer system 104, including a computer mouse, a stylus, a touchpad, a touch screen, or the like. For example, the user may select a graphical element with a mouse click and drag the element to a desired position on the drag and drop canvas. The GUI 106 may be displayed at any suitable output device of computer system 104, including monitors, screens, televisions, or other similar displays.

At block 122, the network design application 108 can be used to create a network architecture design for a computer network by placing graphical elements representing one or more network infrastructure components onto the drag and drop canvas of the GUI 106. Examples of the network infrastructure components can include servers, storage devices, networking devices, etc. Creating the network architecture design can include selecting the number and type of network infrastructure components and placing a graphical element corresponding to the selected components onto the canvas. The user can also place connections between the graphical elements to represent networking interconnections between the components.

The graphical elements of the network design application 108 may be part of a template object that includes parameter values for the infrastructure components. For example, a template object may include a graphical element representing an application server and have a corresponding data structure with parameters that specify the application server's configuration. The parameters can describe the processors of the server (e.g., number of processor cores, type of processor, processor microarchitecture, etc.), amount and type of memory (e.g., amount of dynamic memory, etc.), operating system of the application server (e.g., Linux, Windows, etc.), and the like. Each network infrastructure component available for the design may have a corresponding template object with default parameters. For example, the default application server template object may have four processor cores and 8 GB of memory, such that when the template object is first placed onto the drag and drop canvas, the default parameter values are displayed. The user may change the default values to customize the configuration of the template objects.

At block 124, the computer system 104 may generate a build sheet 112 and a score 116. The parameters of the template objects in the network architecture design may be extracted from the network design application 108 and passed to a network build engine 110 and a scoring engine 114. The build engine 110 and the scoring engine 114 may be implemented as software on computer system 104 or on another computer system with which computer system 104 can communicate. In some embodiments, generating a score 116 may be optional and/or may be performed prior to generating the build sheet 112. The network build engine 110 may be configured to extract the parameter values and use the parameter values to generate the build sheet 112. The network build engine 110 may also obtain information about available networking resources and use the additional information to generate the build sheet 112. For example, the network build engine 110 may obtain information specifying a number of available computing devices in a data center. The network build engine 110 can then generate a build sheet 112 with instructions for provisioning the network infrastructure components from the network architecture design on the available computing devices. As another example, the network build engine 110 can obtain information about an inventory of available computing devices that can be installed into a network environment. The network build engine 110 can then generate the build sheet 112 with instructions for retrieving and installing a computing device from the inventory and instructions to procure additional computing devices to support the network architecture design.

The scoring engine 114 can be configured to extract the parameter values and use the parameter values to generate the score 116. The score 116 may be a value (or more than one value) corresponding to a cost, engineering metric, resource allocation efficiency metric, or other similar metric for evaluating the network architecture design. As an example, the score 116 may correspond to the total cost for implementing the infrastructure components of the network architecture. As another example, the score 116 may correspond to an efficient usage of computing resources for providing one or more services from the proposed network. If the network architecture allocates too many computing resources (e.g., servers with excess processing power or memory) for the proposed use case in the design, the scoring engine 114 may generate a lower score 116 compared to a more efficient use of available computing resources.

Figure 2:
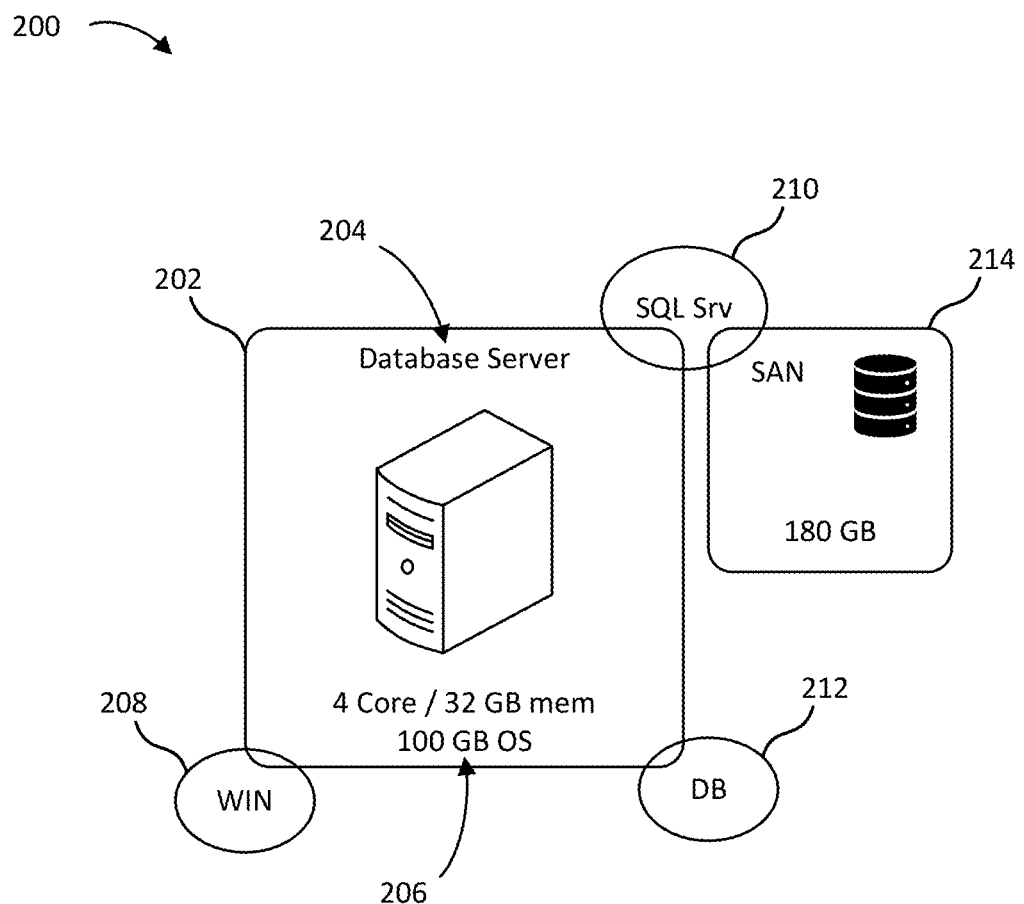
FIG. 2 illustrates an example template object that can be positioned on a drag and drop canvas of a network design application, according to some embodiments.

FIG. 2 illustrates an example template object 200 that can be positioned on a drag and drop canvas of a network design application, such as the network design application 108 of FIG. 1. As discussed above, the template object 200 can represent any suitable network infrastructure component for a network architecture, including servers (e.g., database servers, application servers, web servers, etc.), load balancers, network devices (e.g., switches, routers, gateways, etc.), storage devices (e.g., disk drives and/or arrays for block storage, object storage, distributed caches, network accessible storage, and the like), and user devices (e.g., desktop computers, virtual desktop computers, other network connected computers, etc.). The infrastructure components may be physical devices or may be implemented as virtual devices on another physical computing device. For example, an application server may be configured as one or more virtual machines (VMs) hosted on a physical computing device. Other configurations of physical and virtual computing resources are contemplated, including containers, VMs, server racks, etc. In some examples, the template object 200 can also represent abstract elements of the computer network. For example, a template object can represent one or more users of the computer network, such that the number of users is a parameter for the network architecture related to an expected amount of network traffic.

The template object 200 can include an icon 202 representing an infrastructure resource of a computer network. As depicted in FIG. 2, the icon 202 represents a database server, indicated by the template object name 204. The icon 202 can also include an information field 206 detailing some of the corresponding parameter values of the template object 200. As depicted, the template object 200 is a database server with four processing cores, 32 GB of available memory (e.g., random access memory (RAM)), and 100 GB of available storage for the OS.

Additional parameter values of the template object 200 may be represented by indicators 208, 210, 212. Indicator 208 may display a parameter value for an operating system (OS) (e.g., "WIN" for Windows, Windows Server, or similar) for the computing device represented by template object 200. Indicator 210 may display a parameter value for the type of server component (e.g., "SQL Srv" for an SQL database server). Indicator 212 may display a parameter value for a database component (e.g., "DB" for database server). The values displayed by indicators 208, 210, 212 may be different for different types of infrastructure components. For example, a template object representing "Users" of the computer network may have an indicator displaying that the users are internal users (e.g., accessing the computer network from a private, internal connection) and another indicator displaying an OS for the user devices the users will use to access the computer network. The template object 200 may have more or fewer indicators 208, 210, 212 than depicted in FIG. 2.

In some embodiments, the indicators 208, 210, 212 may be "buttons" or other user-selectable elements. A user can interact with the indicators 208, 210, 212 by, for example, clicking on or tapping the indicators. By interacting with the indicators 208, 210, 212, the user can modify the corresponding parameter value. For example, clicking on indicator 208 may cycle the OS parameter value through a selection of available OSs (e.g., Windows, Linux, AIX, etc.) for the database server represented by the template object 200. As another example, clicking the indicator 208 may cause the network design application to display a menu, such as a drop-down menu, for the template object 200 that the user can interact with the change the corresponding parameter value.

The template object 200 can also include a related icon 214. As shown, icon 214 can represent a storage area network (SAN) with 180 GB of storage available to the database server represented by icon 202. In some embodiments, the related icon 214 may be for a related template object representing one or more components (e.g., storage devices) for the SAN.

In some embodiments, the graphical elements of the template object 200 may be color coded. For example, the indicator 208 may be green when displaying the "WIN" OS, but may be red if displaying "Linux" as the OS. Similarly, the icon 202 may be green if the corresponding infrastructure component is new hardware for an existing network environment, but may be blue if the component is to be provisioned on existing hardware.

Figure 3:
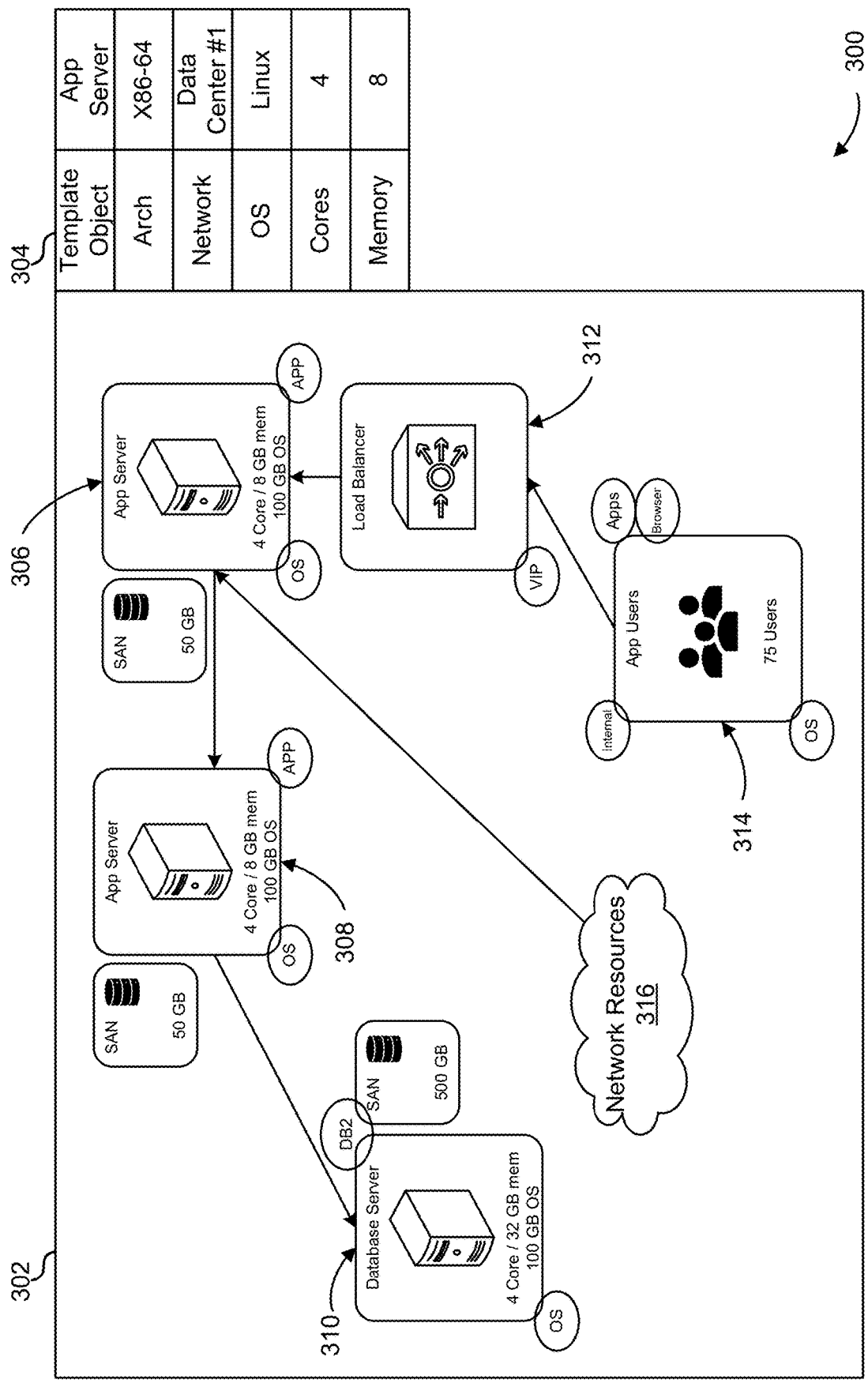
FIG. 3 is a simplified diagram illustrating an example drag and drop canvas of a network design application, according to some embodiments.

FIG. 3 is a simplified diagram illustrating an example GUI 300 displaying a drag and drop canvas 302 of a network design application, according to some embodiments. The network design application may be hosted by any suitable computing device or computer system, including computer system 104 of FIG. 1. Similarly, the GUI 300 may be displayed at any suitable output device of a computer system.

The drag and drop canvas 302 may allow a user to position one or more template objects to form a network architecture. The template objects may be similar to template object 200 of FIG. 2. As shown in FIG. 3, the drag and drop canvas 302 has an application server template object 306, an application server template object 308, a database server template object 310, a load balancer template object 312, and an application users template object 314. Additional network resources 316 may be represented on the drag and drop canvas 302. The network resources 316 can include services available to the proposed network. Examples of such network resources 316 can include existing network applications, email service, etc. In some embodiments, the network resources 316 may be a template object, with parameters associated with the available resources usable by a network build engine and/or a scoring engine to evaluate the network architecture design.

The template objects shown on the drag and drop canvas 302 in FIG. 3 are connected by arrows that indicate connections between the components. For example, the application users template object 314 is connected to the load balancer template object 312, which is in turn connected to the application server template object 306. The connections indicate a general flow of networking traffic between the corresponding components. For example, user devices of the application users would send traffic for an application provided by the application server via the load balancer. The load balancer may be configured to provide a virtual IP address for the application hosted by the application server, which may be implemented on multiple computing nodes of the application server. Similarly, the application server represented by application server template object 306 may communicate with another application server (represented by application server template object 308) and the network resources 316. The storage for the application servers of application server template objects 306 and 308 may be provided by the database server represented by database server template object 310, such that each application server is allocated 50 GB of storage out of the 500 GB of storage available to the database server.

The GUI 300 can also include a menu 304 that shows parameter values for a selected template object. For example, menu 304 can display parameters and parameter values for the application sever template object 306. Parameters depicted in FIG. 3 include processor architecture (e.g., X86-64), network (e.g., "Data Center #1," indicating that the proposed application server should be located in the network of a particular data center), an OS (e.g., "Linux"), cores (e.g., 4 processing cores), and memory (e.g., 8 GB of dynamic memory). The menu 304 may show additional parameter values than are depicted in FIG. 3. The menu 304 can also have user selectable elements to allow a user to modify the parameter values. For example, the "Cores" field may have a drop-down selector to allow a user to select one, two, four, eight, 16, processor cores. In some embodiments, the menu 304 may have editable fields so that a user can specify the desired parameter value. For example, a user may be able to enter the desired number of processor cores into the "Cores" field or a desired amount of dynamic memory in the "Memory" field.

In some embodiments, parameter values of the template objects may be grouped into a collection of "sizes" for the infrastructure component, for instance "small," "medium," and "large" sizes. Each size can have a corresponding set of default parameter values, such that a user can select a size for a template object and have the corresponding default parameter values applied to the template object. For example, computing devices for servers may be available with one processor core and 8 GB of dynamic memory as a "small" server, while computing devices may be available with 16 processor cores and 256 GB of dynamic memory for a "large" server designed for high compute loads. Computing devices with intermediate values for the processor cores and dynamic memory (e.g., 2 cores/16 GB; 4 cores/32 GB; 8 cores/64 GB, etc.) may be designated as "medium" servers. By selecting a size for a template object, the user can avoid manually configuring every parameter value for the template object.

Grouping sets of parameter values according to commonly available configurations can allow both the design of the network architecture and the implementation of the computer network to be simplified. The number of parameters the designer must configure can be reduced, and the hardware that is procured and/or provisioned to support the design can be standardized. For example, the network architect can quickly drop in multiple server template objects onto the drag and drop canvas 302 and select a standard size for each, rather than configuring each server template object individually. In addition, standardized "size" parameters may result in lower scores when a scoring engine evaluates the proposed network architecture, since the standard computing devices may be easier to procure, more cost-effective to provision and maintain, and more efficiently allocate computing resources to the proposed network.

Figure 4:
FIG. 4 illustrates an example collection of various template objects, according to some embodiments.

FIG. 4 illustrates an example collection 400 (e.g., library) of various template objects, according to some embodiments. As discussed above, the template objects can correspond to infrastructure components of a computer network. The collection 400 may be displayed as part of the graphical user interface of a network design application, such as the GUI 300 of FIG. 3. A user can then interact with one of the icons of the collection 400 to select a desired template object and position the selected template object onto the drag and drop canvas of the GUI. Some specific examples of template objects shown in FIG. 4 include virtual machine (VM) server 402, SQL server 404, and database server 406, but many other template objects are also shown. Database server 406 may be similar to the database server template object 310 of FIG. 3. As shown in FIG. 4, some template objects may represent virtual components of the network. For example, SQL server 404 can represent a virtual SQL, which can be a server implemented on a VM of a physical computing device available for the network. Other template objects may represent physical infrastructure components.

The template objects of the collection 400 may have a corresponding default set of parameter values. When selected and positioned by a user of the network design application, the template object may be incorporated into the architecture design with the default parameter values. For example, selecting and placing the SQL server 404 may result in a server template object with a default four processing cores, 32 GB of dynamic memory, 100 GB of storage, and a Windows operating system. Each time another SQL server 404 is selected and placed onto the drag and drop canvas, the new template object will have the same default values. The default values may be configured by the user (e.g., before the template object is positioned on the canvas).

In some embodiments, the default values for the template objects in the collection 400 may be selected based on engineering considerations for the most efficient parameters for the various infrastructure components. Standardizing template object parameter values in this way can avoid additional manual reviews and/or manual configuration of the corresponding components. Standard parameter values may be more readily provisioned on existing hardware, since the hardware inventory may be more efficiently managed when standard values are known prior to designing the new architecture. A user can also create new template objects, for example if the existing collection 400 of template objects lacks a desired infrastructure component. If a user creates a new template object, the new template object may be reviewed (e.g., by a reviewing entity) to determine if the new template object should become a standard template object. If approved, the new template object may be added to the collection 400 as a standard template object for subsequent use by the same user or other users.

Figure 5:
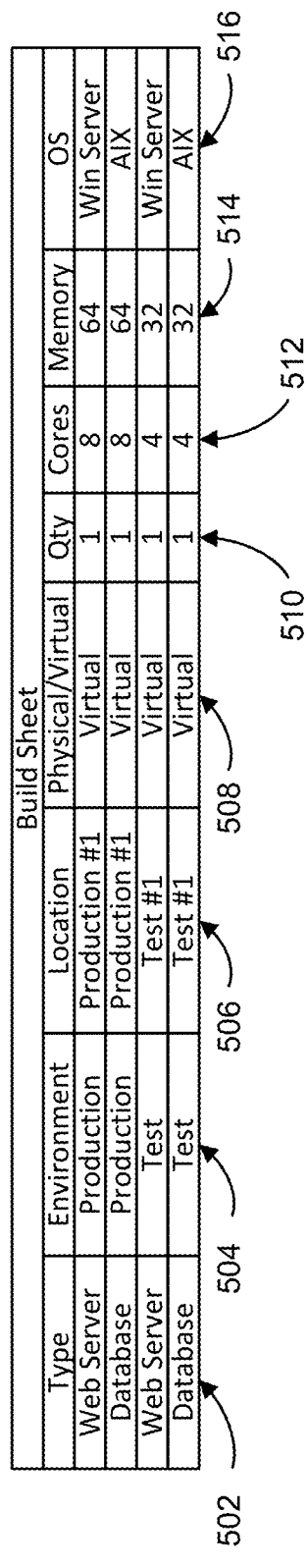
FIG. 5 depicts a portion of an example build sheet, according to some embodiments.

FIG. 5 depicts a portion of an example build sheet 500, according to some embodiments. The build sheet 500 is depicted as a table, but the data of the build sheet 500 may be stored as any suitable data structure, such as a table, array, list, object, etc. The build sheet 500 can include parameter values for some or all of the template objects (e.g., template objects 306-314 of FIG. 3) in a network architecture design. The collection of parameter values in the build sheet 500 may partially or completely specify the infrastructure components corresponding to the architecture design.

The build sheet 500 can include a component inventory with each component's parameter values, such as the type 502 of infrastructure component (e.g., web server, application server, database server, database, storage device, etc.), environment 504 (e.g., production, test, etc.), location 506 (e.g., available data centers for hosting the infrastructure components), whether the infrastructure component is physical or virtual 508, the quantity 510 of infrastructure components, the number of processor cores 512, the amount of dynamic memory 514, the operating system 516, the amount of allocated storage, whether the components form a computing cluster, available file sharing directories, locations of volume mount points (e.g., filesystem locations for standard volumes), whether the component is in an exposed environment within the proposed network (e.g., within a "demilitarized zone" (DMZ) subnetwork), or any combination of these. The build sheet 500 can also specify other information, such as one or more applications to be deployed on the infrastructure components to support the function of the component. For example, a database server may use a server application (e.g., Microsoft SQL Server). The build sheet 500 may also include information identifying responsible parties or reviewing, approving, and/or implementing the proposed architecture. Examples of the responsible parties may include engineers, technicians, etc.

The build sheet 500 can also include instructions for provisioning the infrastructure defined by the parameter values described above. The instructions may be usable to manually provision the infrastructure, for example by an engineer or technician. The instructions may also be readable and executable by computer to automatically provision the infrastructure. For example, the instructions may be usable to initiate a provisioning task on a provisioning server communicatively connected to available infrastructure hardware, such as one or more computing device in a data center. The provisioning task can then allocate hardware for the corresponding networking components described by the build sheet 500, where the parameter values for the corresponding component are used to determine which hardware is allocated (e.g., which device has the correct number of available processor cores and amount of available dynamic memory), which software is installed (e.g., OS, server applications, etc.), and/or how the resulting component is logically arranged in the computer network (e.g., in the DMZ, provided with a specific host or device name, etc.).

Figure 6:
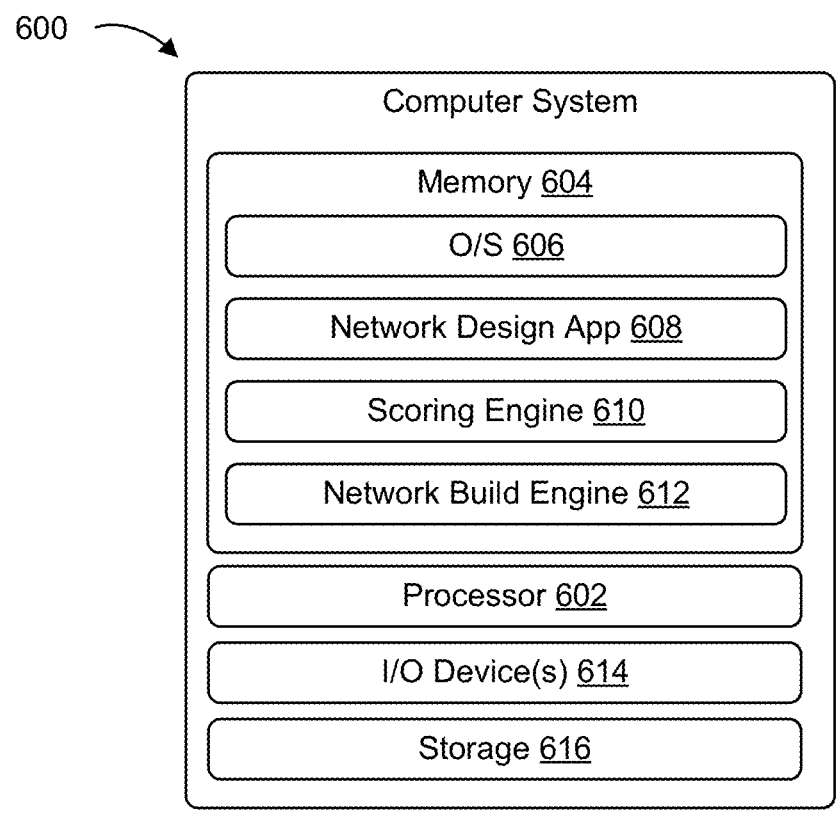
FIG. 6 is a simplified block diagram of an example computer system, including a plurality of modules that may perform functions in accordance with at least one embodiment.

FIG. 6 is a simplified block diagram of an example computer system 600, including a plurality of modules that may perform functions in accordance with at least one embodiment. The computer system 600 may be an example of computer system 104 of FIG. 1 that is capable of hosting a network design application. The computer system 600 can have at least one memory 604, a processor 602, and one or more input/output ("I/O") devices 614. The I/O device(s) 614 can include displays, monitors, touch screens, a mouse, a keyboard, or other suitable I/O devices.

The processor 602 can include one processing device or multiple processing devices. Non-limiting examples of the processor 602 include a Field-Programmable Gate Array (FPGA) or an application-specific integrated circuit (ASIC), a microprocessor. The processor 602 can execute instructions stored in the memory 604 to perform operations. In some examples, the instructions can include processor-specific instructions generated by a compiler or an interpreter from code written in any suitable computer-programming language, such as C, C++, C #, and Java.

Memory 604 can include one memory device or multiple memory devices. The memory 604 may store program instructions that are loadable and executable on the processor 602, as well as data generated during the execution of these programs, including network architecture designs, template objects (e.g., template object 200 of FIG. 2), build sheets (e.g., build sheet 500 of FIG. 5), scores (e.g., score 116 of FIG. 1), etc. Depending on the configuration and type of computer system 600, the memory 604 may be volatile (such as random access memory ("RAM")) or non-volatile (such as read-only memory ("ROM"), flash memory, etc.). In some implementations, the memory 604 may include multiple different types of memory, such as static random access memory ("SRAM"), dynamic random access memory ("DRAM") or ROM.

The computer system 600 may also include additional storage 616, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In these embodiments, the storage 616 may be utilized to store data contents received from one or more other devices, including build sheets, scores, network architecture designs, template objects, and the like.

In some embodiments, the computer system 600 can include more than one computing device, including a user device and a server device. For example, the computer system can include a server device configured to host a network design application 608, where the user device is configured to communicate with the server device over one or more networks to access the network design application 608 for creating a network architecture. Examples of the networks can include the Internet, wireless networks, cellular networks, and other private and/or public networks.

The memory 604 may include an operating system 606 and one or more application programs, modules, or services for implementing the features disclosed herein, including a network design application 608, a scoring engine 610, and a network build engine 612. The network design application 608 may be configured to generate a GUI at a display, monitor, or another of the I/O devices 614. The network design application 608 may have a drag and drop canvas as part of the GUI. One example of the drag and drop canvas can be the canvas 302 of FIG. 3. The network design application 608 may receive user input at the GUI to position one or more template objects in a particular arrangement to form a computer network architecture.

In some embodiments, the scoring engine 610 may be configured to determine a score based on the parameters of the template objects in the particular arrangement of template objects for a computer network architecture. The score may correspond to a total financial cost of implementing, procuring, maintaining, and/or operating the network infrastructure components of the proposed network architecture. The score may alternatively indicate the efficient use of infrastructure components for a proposed network architecture. The scoring engine 610 may extract the parameter values from the template objects. The parameter values may then be inputs into a model used to generate the score. As an example, the model can include base values for each parameter, including a base value for each computer processor, unit of dynamic memory, unit of available storage, type of OS, and type of installed software. The score can then be a total of the base values for the quantities/amount defined by the parameter values. As another example, the model can include weights for each parameter that correspond to an efficiency of the parameter (e.g., the number of processor cores of an application server) with respect to other parameters (e.g., the number of application users). The score can then be a weighted sum or weighted average of the input parameter values.

In some embodiments, the network build engine 612 may be configured to generate a build sheet, such as build sheet 500 of FIG. 5. The build sheet may be generated using the parameter values of the template objects of the computer network architecture. The network build engine 612 may extract the parameter values from the template objects. The network build engine 612 can also generate one or more instructions that specify how infrastructure components may be provisioned to create the computer network defined by the network architecture. The instructions can be manually used by a technician or an engineer to provision and configure the components of the computer network. Additionally or alternatively, the instructions can be automatically used by a provisioning server or similar computer system to provision and configure the components of the computer network. The network build engine 612 may also be configured to obtain additional information regarding available infrastructure resources for implementing the computer network. For example, the network build engine 612 can obtain inventory information about hardware resources that are available for use when implementing the network design. Examples of the hardware resources can include additional servers or other computing devices. The network build engine 612 can use the inventory information to generate an instruction that the additional hardware should be installed and provisioned as part of implementing the network design.

Figure 7:
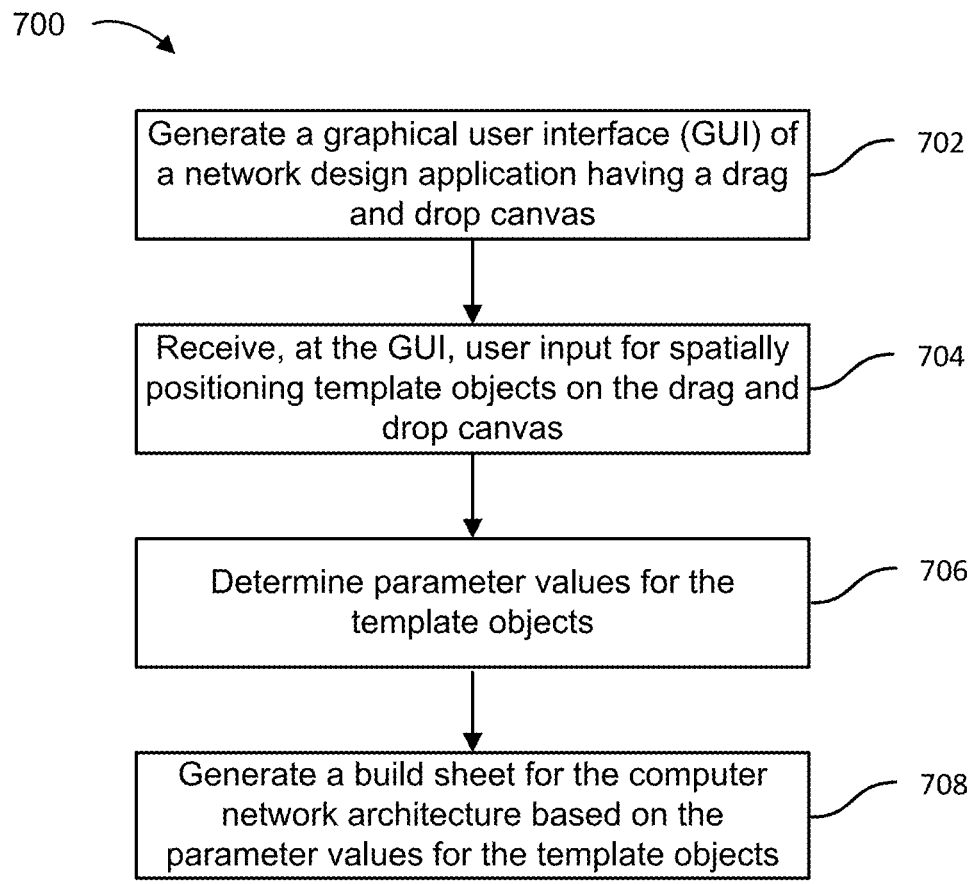
FIG. 7 is a flow diagram of an example process for designing a network architecture and generating a build sheet from a particular arrangement of template objects positioned on a drag and drop canvas of a network design application, according to some embodiments.

FIG. 7 is a flow diagram of an example process 700 for generating a build sheet from a particular arrangement of template objects positioned on a drag and drop canvas of a network design application, according to some embodiments. The process 700 may be performed by one or more components of a computer system.

The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 700 may begin at block 702 with a computer system generating a GUI of a network design application having a drag and drop canvas. An example of the computer system can include the computer system 600 of FIG. 6. An example of the network design application can include the network design application 608 of FIG. 6. The network design application may be a general purpose drawing or visualization application, an engineering computer aided drawing application, or other similar application for creating computer network architectures. The drag and drop canvas can allow a user to position one or more template objects to form the computer network architecture. The template objects can correspond to network infrastructure components including servers, storage devices, networking equipment, and the like.

At block 704, user input to position the template objects can be received at the GUI. The template objects may be positioned spatially on the drag and drop canvas as desired to create the visual representation of the network architecture. Examples of the template objects can include the template object 200 of FIG. 2 or template objects 306-312 of FIG. 3.

At block 706, the processor of the computer system can determine parameter values for the template objects that form the computer network architecture. Some of the parameter values may be selected or customized by a user when placing the template objects. Others of the parameter values may be default values. The parameter values can describe the characteristics of the corresponding infrastructure component, including the component's type, location, number of processor cores, amount of dynamic memory, and so on.

At block 708, the processor can generate a build sheet for the computer network architecture using the parameter values. An example of the build sheet can include the build sheet 500 of FIG. 5. The build sheet can include a component inventory of the some or all the corresponding infrastructure components for the template objects used to from the network architecture. The build sheet can also include instructions that are usable to implement (e.g., procure, install, and/or provision) the infrastructure components into a computer network according to the network architecture. In some embodiments, the processor can obtain availability information for one or more physical resources for hosting the computer network architecture. The availability information may be stored in a storage accessible to the computer system or provided by another computer system. For example, the availability information may be information about the resources in a data center, including which servers in the data center are available for provisioning to host the network infrastructure components. The processor can then select a physical resource that is available and generate an instruction to provision the physical resource to host the infrastructure component.

In some embodiments, additional user input can be received at the GUI to modify at least one of the parameter values for a template object in the computer network architecture. For example, a user may select a selectable indicator (e.g., indicator 208 of FIG. 2) to cycle the corresponding parameter value through available values. In another example, the user may select a parameter value from a drop-down menu or input a custom parameter value. In some embodiments, the user input can include a selection of a set of preconfigured parameter values (e.g., "sizes" of infrastructure components described above with respect to FIG. 3).

In some embodiments, additional user input can be received at the GUI to connect a template object with another template object. The connection may define an expected communication pathway between the infrastructure components, with network traffic traveling between the two infrastructure components. Based on the connection, a parameter value of the template object may be modified. For example, a template object for an application server may be positioned on the drag and drop canvas and configured with parameter values for one processor core and 8 GB of dynamic memory. The user may subsequently position a template object representing 150 application users. The user can connect the user template object with the application template object, indicating that the application server will be serving application traffic for the 150 users within the network. Based on the parameter value of 150 users, the computer system may modify the processor and/or memory template values to increase the processor cores to eight cores and the dynamic memory to 64 GB to adequately handle application traffic from 150 users.

In some embodiments, the processor can generate a score for the computer network infrastructure. The score may be generated by a scoring engine of the computer system. The scoring engine can use a model to determine the score.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A method comprising:
generating, by a processor, a graphical user interface (GUI) of a network design application having a drag and drop canvas, the network design application including template objects representing computer infrastructure components, each template object comprising a configuration for a corresponding computer infrastructure component and being individually positionable on the drag and drop canvas;
receiving, by the processor and at the GUI, user input for spatially positioning the template objects on the drag and drop canvas in a particular arrangement to form a computer network architecture;
determining, by the processor, parameter values for the template objects forming the computer network architecture; and
generating, by the processor, a build sheet for the computer network architecture based on the parameter values for the template objects and the particular arrangement of the template objects on the drag and drop canvas, the build sheet comprising a component inventory for the computer network architecture and instructions usable to provision the computer network architecture.

2. The method of claim 1, further comprising receiving, by the processor and at the GUI, additional user input for modifying at least one of the parameter values for a template object in the computer network architecture.

3. The method of claim 2, wherein the additional user input comprises a user selection of a set of preconfigured parameter values for the template object.

4. The method of claim 2, wherein the template objects comprise selectable indicators displaying current values of the parameter values, and wherein the additional user input comprises a user selection of one of the selectable indicators for modifying a corresponding parameter value.

5. The method of claim 1, wherein receiving the user input for spatially positioning the template objects comprises:
   receiving, by the processor, additional user input for creating a connection between a template object and another template object positioned on the drag and drop canvas; and
   modifying, by the processor and based at least in part on the connection, a parameter value for the template object.

6. The method of claim 1, wherein generating the build sheet comprises:
   obtaining, by the processor, availability information for one or more physical resources for hosting the computer network architecture;
   selecting, by the processor and based at least in part on the availability information, a physical resource of the one or more physical resources, the physical resource being available to host an infrastructure component of the computer network architecture; and
   generating, by the processor, an instruction in the build sheet to provision the physical resource to host the infrastructure component of the computer network architecture.

7. The method of claim 1, further comprising generating, by the processor, a score for the computer network architecture based on the parameter values for the template objects and the particular arrangement of the template objects on the drag and drop canvas.

8. A computer system comprising:
   a processor; and
   a memory storing computer-executable instructions that are executable by the processor for causing the computer system to:
      generate a graphical user interface (GUI) of a network design application having a drag and drop canvas, the network design application including template objects representing computer infrastructure components, each template object comprising a configuration for a corresponding computer infrastructure component and being individually positionable on the drag and drop canvas;
      receive, at the GUI, user input for spatially positioning the template objects on the drag and drop canvas in a particular arrangement to form a computer network architecture;
      determine parameter values for the template objects forming the computer network architecture; and
      generate a build sheet for the computer network architecture based on the parameter values for the template objects and the particular arrangement of the template objects on the drag and drop canvas, the build sheet comprising a component inventory for the computer network architecture and instructions usable to provision the computer network architecture.

9. The computer system of claim 8, wherein the memory stores additional instructions that are executable by the processor for causing the computer system to further receive, at the GUI, additional user input for modifying at least one of the parameter values for a template object in the computer network architecture.

10. The computer system of claim 9, wherein the additional user input comprises a user selection of a set of preconfigured parameter values for the template object.

11. The computer system of claim 9, wherein the template objects comprise selectable indicators displaying current values of the parameter values, and wherein the additional user input comprises a user selection of one of the selectable indicators for modifying a corresponding parameter value.

12. The computer system of claim 8, wherein the memory stores additional instructions that are executable by the processor for causing the computer system to:
   receive another user input for creating a connection between a template object and another template object positioned on the drag and drop canvas; and
   modify, based at least in part on the connection, a parameter value for the template object.

13. The computer system of claim 8, wherein generating the build sheet comprises:
   obtaining availability information for one or more physical resources for hosting the computer network architecture;
   selecting, based at least in part on the availability information, a physical resource of the one or more physical resources, the physical resource being available to host an infrastructure component of the computer network architecture; and
   generating an instruction to provision the physical resource to host the infrastructure component of the computer network architecture.

14. The computer system of claim 8, wherein the memory stores additional instructions that, when executed with the processor, cause the computer system to further generate a score for the computer network architecture based on the parameter values for the template objects and the particular arrangement of the template objects on the drag and drop canvas.

15. A non-transitory computer-readable storage medium storing instructions that are executable by a processor for causing a computer system to:
   generate a graphical user interface (GUI) of a network design application having a drag and drop canvas, the network design application including template objects representing computer infrastructure components, each template object comprising a configuration for a corresponding computer infrastructure component and being individually positionable on the drag and drop canvas;
   receive, at the GUI, user input for spatially positioning the template objects on the drag and drop canvas in a particular arrangement to form a computer network architecture;
   determine parameter values for the template objects forming the computer network architecture; and
   generate a build sheet for the computer network architecture based on the parameter values for the template objects and the particular arrangement of the template objects on the drag and drop canvas, the build sheet comprising a component inventory for the computer network architecture and instructions usable to provision the computer network architecture.

16. The non-transitory computer-readable storage medium of claim 15, further comprising instructions that are executable by the processor for causing the computer system to receive, at the GUI, additional user input for modifying at least one of the parameter values for a template object in the computer network architecture.

17. The non-transitory computer-readable storage medium of claim 16, wherein the additional user input comprises a user selection of a set of preconfigured parameter values for the template object.

18. The non-transitory computer-readable storage medium of claim 16, wherein the template objects include visual representations of their corresponding computer infrastructure components and comprise selectable indicators displaying current values of the parameter values, and wherein the additional user input comprises a user selection of one of the selectable indicators for modifying a corresponding parameter value.

19. The non-transitory computer-readable storage medium of claim 15, further comprising instructions that are executable by the processor for causing the computer system to:
   receive another user input for creating a connection between a template object and another template object positioned on the drag and drop canvas; and
   modify, based at least in part on the connection, a parameter value for the template object.

20. The non-transitory computer-readable storage medium of claim 15, wherein generating the build sheet comprises:
   obtaining availability information for one or more physical resources for hosting the computer network architecture;
   selecting, based at least in part on the availability information, a physical resource of the one or more physical resources, the physical resource available to host an infrastructure component of the computer network architecture; and
   generating an instruction for provisioning the physical resource to host the infrastructure component of the computer network architecture.

* * * * *